R. WHELAN.
VALVE FOR RENDERING TANKS.

No. 247,724.  Patented Sept. 27, 1881.

Witnesses

Inventor
Robert Whelan
By Coburn & Thacher
Attorneys

UNITED STATES PATENT OFFICE.

ROBERT WHELAN, OF CHICAGO, ILLINOIS, ASSIGNOR OF ONE-HALF TO JOHN A. ATKINSON, OF SAME PLACE.

VALVE FOR RENDERING-TANKS.

SPECIFICATION forming part of Letters Patent No. 247,724, dated September 27, 1881.

Application filed January 12, 1880.

*To all whom it may concern:*

Be it known that I, ROBERT WHELAN, of the city of Chicago, in the county of Cook and State of Illinois, have invented a certain new and useful improvement in Valves for Rendering-Tanks, which is fully set forth and described in the following specification, reference being had to the accompanying drawings, in which—

Figure 1:
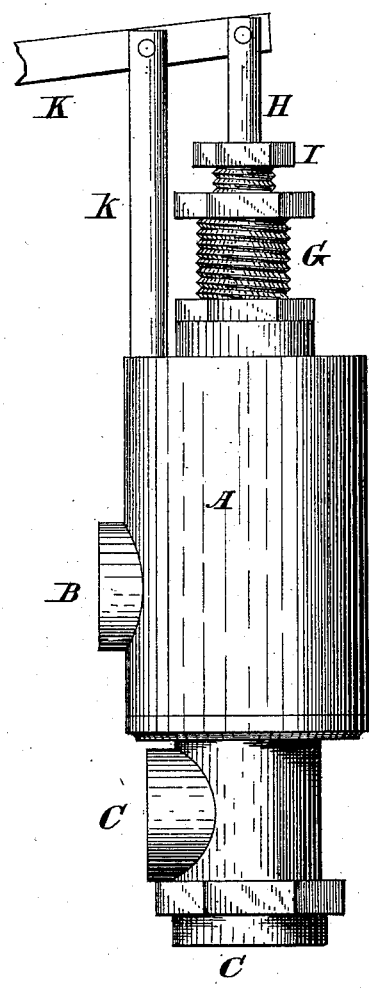
Figure 2:
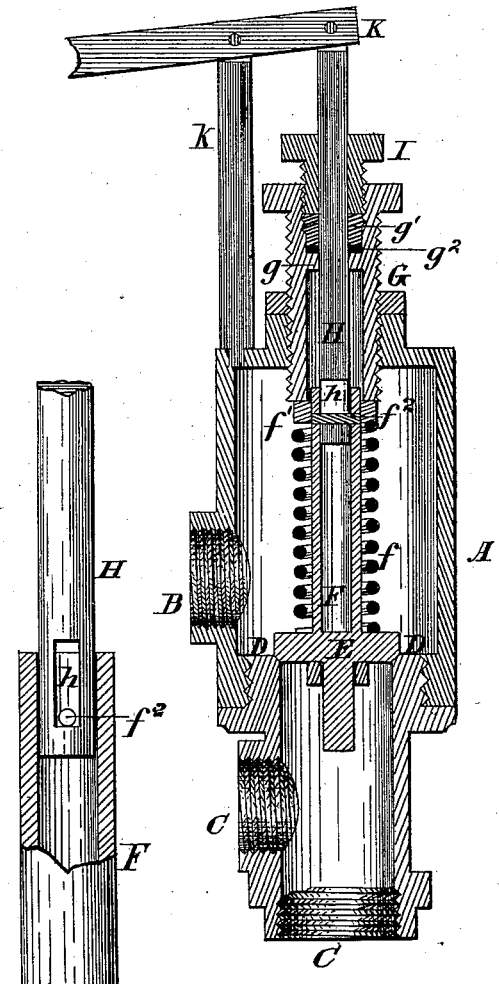

Figure 1 represents a side view of a valve containing my improvements; Fig. 2, a longitudinal section of the same, and Fig. 3 a detached detailed view of the valve and valve-stem on an enlarged scale.

My invention relates to valves which are attached to rendering-tanks to regulate and prevent the escape of the noxious gases generated therein; but it is also applicable to other machines when such valves are desired.

My invention consists in a valve in which a valve-disk is connected with a freely-sliding stem by a sliding joint, whereby the disk is permitted to be moved a limited distance independently of the main stem, and then to move the stem with it and fully open the outlet, as hereinafter explained.

In the drawings, A represents the valve-chest casing, having the escape-opening B, from which the conducting-pipe leads to the receiver, and the openings C, through which connection is made directly with the rendering-tank and also the valve-seat D, upon which rests the valve E, all of which are of ordinary construction.

The inner section, F, of the valve-stem is tubular, and around it is coiled the spring $f$, which is held in place by the collar or annular ring $f'$, fitted to the top of the section F.

A threaded thimble or tube, G, is fitted to the stem-opening in one end of the chest, and is screwed down until its inner end rests upon the collar $f'$, to give the required tension to the coiled spring $f$.

Figure 3:
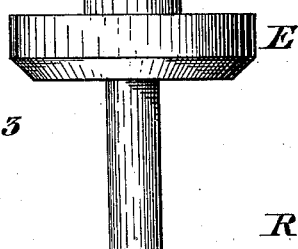

The outer section, H, of the valve-stem is fitted at its inner end into the open end of the tubular section F, and is provided with a longitudinal slot, $h$, within which plays a pin, $f^2$, which passes through the upper end of the tubular section F, as shown in Fig. 3 of the drawings. The section H passes up through the thimble G and fits closely within a second smaller screw thimble or tube, I.

The tubular screw I is fitted to the interior of thimble G, the upper end of which is threaded internally for its reception, and the section H passes up through the thimble I, which constitutes a box therefor, and is pivoted to one end of a lever, K.

A diaphragm, $g$, extends across the interior of the thimble G below the thimble I, being provided with an opening for the passage of the upper section of the valve-stem, and above it is the stuffing-box $g'$, within and at the bottom of which is placed a flat rubber ring or gasket, $g^2$. The rubber and packing in the stuffing-box prevent the escape of any noxious gases, and are held in place by the tubular screw I, by means of which the packing may also be compressed, when necessary.

The lower or tubular section of the valve-stem, it is evident, may have a limited vertical movement independently of the upper section, which is attached to the lever, this movement being limited by the length of the slot in the lower end of the upper section.

The open space in the thimble G, below the diaphragm, permits the upper end of the tubular section F to move back and forth within it.

The lever K is pivoted to a suitable support, $k$, and is given any desired connection by means of which it may be operated, when necessary.

Valves have in some instances hitherto been provided with a threaded stem carrying a disk or plug capable of a limited movement independently of said stem; but as commonly used in connection with rendering-tanks the valve-stem has been made in one piece and passed out through the end of the chest and attached to the lever. Now, as the valve is constantly playing, the disadvantage of this construction is that during this movement there is constant motion of the valve-stem back and forth in the stuffing-box, and hence in a short time it is so worn that it permits the escape of the noxious gases. In my improvement above described this difficulty is overcome, as the valve and lower section of the stem are free to move to the extent of the length of the slot $h$ without any motion being communicated to that part of the stem passing through the stuffing-box, and consequently there is no wear of the packing, except in extreme cases, when the pressure in both tank and receiver is so great as to cause the pin to press outward against the outer end of the slot, when the outer section of the stem will also be driven outward. By moving the outer section of the valve-stem it can readily be ascertained at any time whether the valve is in place and working properly, and the valve may be adjusted to open to any desired extent by proper adjustment or weighting of the lever, by means of which the valve may also be raised to blow off whenever desired.

I have described my improvement as applied to rendering-tanks, for which it is especially desirable, as any leakage is offensive; but it is obvious that the invention is applicable to other positions, and, in fact, may be used with any mechanism when similar conditions exist in connection with the use of a safety or check valve and it is desired to prevent all leakage.

Changes may be made in the construction and arrangement of some of the parts without affecting the main point of my invention.

I am aware that a valve-plug has been connected with a screw-stem in such manner as to have a limited play independently of said stem; but such construction cannot effect the objects attained by my device,' and is not claimed by me.

Having thus described my invention, what I claim as new, and desire to secure by Letters Patent, is—

1. The herein-described valve, consisting of the shell A, containing the valve-seat D, the operating-stem H, arranged to slide freely through the case, and the valve-disk E, connected with and arranged to move a limited distance independently of the operating-stem, and held to its seat by a spring, substantially as shown and described.

2. In a blow-off valve for rendering-tanks, &c., a valve-disk connected with a freely-sliding valve-stem by a sliding joint, substantially as described, whereby the disk is permitted to be moved a limited distance by the pressure from within the tank, and then to move the plug and stem together to fully open the valve.

ROBERT WHELAN.

Witnesses:
L. A. BUNTING,
A. P. HOLLISTER.